Figure 1:
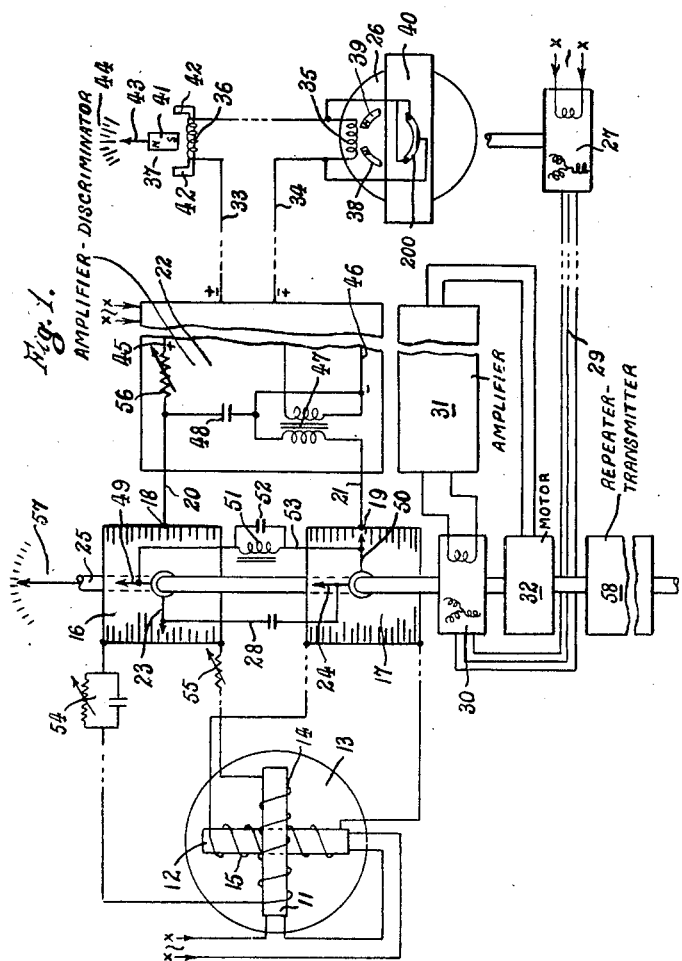

June 3, 1952  H. C. PRITCHARD ET AL  2,599,124
GYROMAGNETIC COMPASS APPARATUS
Filed Feb. 27, 1948  2 SHEETS—SHEET 2

INVENTORS:
HAROLD CHARLES PRITCHARD
IVOR LEWIS THOMAS
GWILYM EMRYS ROBERTS
BY Richardson, David and Nordon
ATTYS

Patented June 3, 1952

2,599,124

UNITED STATES PATENT OFFICE 2,599,124

GYROMAGNETIC COMPASS APPARATUS

Harold Charles Pritchard, Ivor Lewis Thomas, and Gwilym Emrys Roberts, South Farnborough, England, assignors, by mesne assignments, to Kelvin & Hughes Limited, Glasgow, Scotland, a company of Great Britain Application February 27, 1948, Serial No. 11,556
In Great Britain February 13, 1945

Section 1, Public Law 690, August 8, 1946
Patent expires February 13, 1965

11 Claims. (Cl. 33—222)

This invention relates to gyromagnetic compass apparatus, especially for aircraft, in which two heading references afforded by magnetic and gyroscopic means, respectively, are compared or set one against the other to control means for adjusting the gyroscopic reference to correspondence with the magnetic reference.

The invention has for an object to provide improvements in such compass apparatus combining ease of manufacture and light weight with accuracy in operation.

In gyromagnetic compass apparatus according to the invention, electromagnetic detector elements define a magnetic heading reference by producing outputs corresponding to components of the earth's field along reference axes, said outputs are applied to sine-cosine potentiometers, which are adjusted in accordance with a heading reference afforded by a gyroscope, and the resulting outputs from said sine-cosine potentiometers are applied together to control means for adjusting the gyroscopic heading reference so that when the magnetic and gyroscopic references diverge said means are rendered operative in the sense appropriate to bring the gyroscopic reference to correspondence with the magnetic reference.

In general two detector elements disposed mutually at right angles will be pendulously mounted as a unit for installation for use with said elements extending for convenience fore and aft and transversely, respectively, of an aeroplane or other craft, so as to produce outputs corresponding to the cosine and to the sine, respectively, of the magnetic heading angle, and two corresponding sine-cosine potentiometers will be adjusted in accordance with the sine and with the cosine, respectively, of the gyroscopic heading angle, so that the resulting outputs from the potentiometers will correspond to the cosine multiplied by the sine and to the sine multiplied by the cosine, respectively, of the same angle when the magnetic and gyroscopic heading references are in correspondence.

In order to compensate or reduce errors in the system, there may be produced at the detector elements local field components in opposition to the components of the earth's field along the magnetic heading reference axes.

In this way, the output from the detector elements applied to the sine-cosine potentiometers may be made proportional to the components of the earth's field along the corresponding reference axes to a high degree of accuracy by feeding the outputs from said elements to corresponding potentiometers by way of separate amplifiers including phase discriminating rectifier means, the direct current outputs from which are applied to feed back coils associated with the detector elements as well as to said potentiometers, respectively, to produce at said elements local field components in opposition to the earth's field components along the magnetic heading reference heading axes, the feed back coils being preferably connected in series with the sine-cosine potentiometers, respectively.

Preferably, however, there are produced at the detector elements and in opposition to the components of the earth's field along the reference axes local nulling field components which, when the gyroscopic and magnetic heading references correspond, are substantially equal in magnitude to said components of the earth's field but, otherwise, differ from such substantial equality to said earth's field components with divergence of the gyroscopic heading reference from the magnetic heading reference. For producing such local nulling field components, coils at the detector elements may be energised by one or more sine-cosine potentiometers connected with a direct current supply and adjusted in accordance with the gyroscopic heading reference to produce the local nulling field components. The potentiometers receiving the outputs from the detector elements and the pick-up windings of said elements may be used in conjunction with a direct current supply (e. g. that of an amplifier to which the "signal" outputs of the potentiometers are applied together to control the means for adjusting the gyroscopic heading reference) to produce the local nulling field components. Thus, the same sine-cosine potentiometers may be connected with the pick-up windings of corresponding detector elements, on the one hand, and with their outputs together to control the means for adjusting the gyroscopic reference, and with a direct current supply, on the other hand, may have alternating current moving contacts and direct current moving contacts all adjusted in accordance with the gyroscopic heading reference, and serve by virtue of said direct current moving contacts to energise said pick-up windings to produce the local nulling field components, provision being made to separate the direct current and alternating current circuits. In such case, where two detector elements are disposed fore and aft and transversely, respectively, of an aeroplane or other craft in which the apparatus is installed, as set forth above, the alternating current moving contacts of the sine-cosine potentiometers may be adjusted in accordance with the sine and with the cosine respectively, of the gyroscopic heading angle and the direct current moving contacts of said potentiometers in accordance with the cosine and with the sine, respectively, of said angle, said moving contacts being so disposed in relation to one another and to the windings or resistance elements of the potentiometers that the pick-up winding of the fore and aft detector element is energised by direct current in accordance with the cosine of the gyroscopic heading angle and that of the transverse element in accordance with the sine of said angle.

The gyroscopic heading reference is preferably afforded by an azimuth gyroscope which the means for adjusting the gyroscopic reference serve to precess in azimuth, and the sine-cosine potentiometers may be directly associated with the gyroscope assembly for adjustment thereby.

The sine-cosine potentiometers may, however, be connected indirectly by electric means with a gyroscope for adjustment in accordance with the gyroscopic heading reference. This arrangement is preferable where heading indications or drives in accordance with heading are to be transmitted to subsidiary apparatus as it enables the transmitting means to be dissociated from the gyroscope, thus simplifying the gyroscope assembly, and still to be operated in accordance with the most accurate heading reference, so that not only may appreciable torque be transmitted but, if desired, highly accurate transmitting means themselves, it may be, requiring considerable torque for their operation may be employed. Moreover, the errors due to the electric means connecting the sine-cosine potentiometers with the gyroscope, to which a heading indication afforded by the gyroscope will then be subject, will not in general be disadvantageous, such gyroscope heading indication remaining sufficiently accurate for use by a pilot, for instance.

Instead of an azimuth gyroscope, in compass apparatus according to the invention, a rate-of-turn gyroscope and an integrating motor actuated in accordance with the output from a pick-off device associated with said rate-of-turn gyroscope, may be employed to afford the gyroscopic heading reference, the sine-cosine potentiometers being connected with such integrating motor for adjustments thereby in accordance with the gyroscopic heading reference, and the outputs from said potentiometers being applied together to said motor, or to an additional motor to adjust the gyroscopic reference, said potentiometers being thus adjusted in accordance with their combined outputs as well as in accordance with the output from the pick-off device associated with the rate-of-turn gyroscope.

It will be understood that, owing to the large dip angle of the earth's field at latitudes remote from the equator, the magnetic heading reference defined by the detector elements may be substantially in error when said elements are displaced from the horizontal, for example due to banked turns or other manoeuvres of a craft in which the compass is installed, with the result that the adjustment of the gyroscopic heading reference in accordance with the output from the sine-cosine potentiometers will be correspondingly incorrect. Such magnetic heading error will be introduced by displacement of the detector elements with reference to a north-south axis, being maximum for displacement about a north-south axis and zero for displacement of the detector elements about an east-west axis. In general, the maximum rate of adjustment of the gyroscopic heading reference will be kept slow in order to limit the effect of such magnetic heading error. If desired, however, advantage may be taken of this "directionality" by employing an azimuth gyroscope not only to afford the gyroscopic heading reference but also, in accordance with the invention which is the subject of British Patent No. 586,507, automatically to prevent adjustment of said reference when conditions are such as by displacement of the detector elements from the horizontal to cause the magnetic heading reference to be in error in excess of a predetermined amount. Thus in compass apparatus according to the invention an azimuth gyroscope affording the gyroscopic heading reference may have its spin axis disposed east-west when the apparatus is in use, so that it will be responsive to accelerations or other conditions tending to displace the detector elements about a north-south axis, and may have associated therewith means actuated by displacement of the spin axis relatively to apparent gravity and/or the gyroscope frame, for preventing adjustment of the gyroscope heading reference. The anti-topple or levelling means of the gyroscope thus employed may be used to actuate a switch or relay, or a mercury or other gravity operated switch may be mounted on the inner gimbal ring of such east-west gyroscope, whereby when the spin axis of the gyroscope is displaced relatively to apparent gravity and/or the gyroscope frame by more than a predetermined amount, the means for adjusting the gyroscopic heading reference are rendered inoperative, e. g. by the short circuiting of a coil energisation of which precess the gyroscope in azimuth to adjust said reference.

Figure 2:
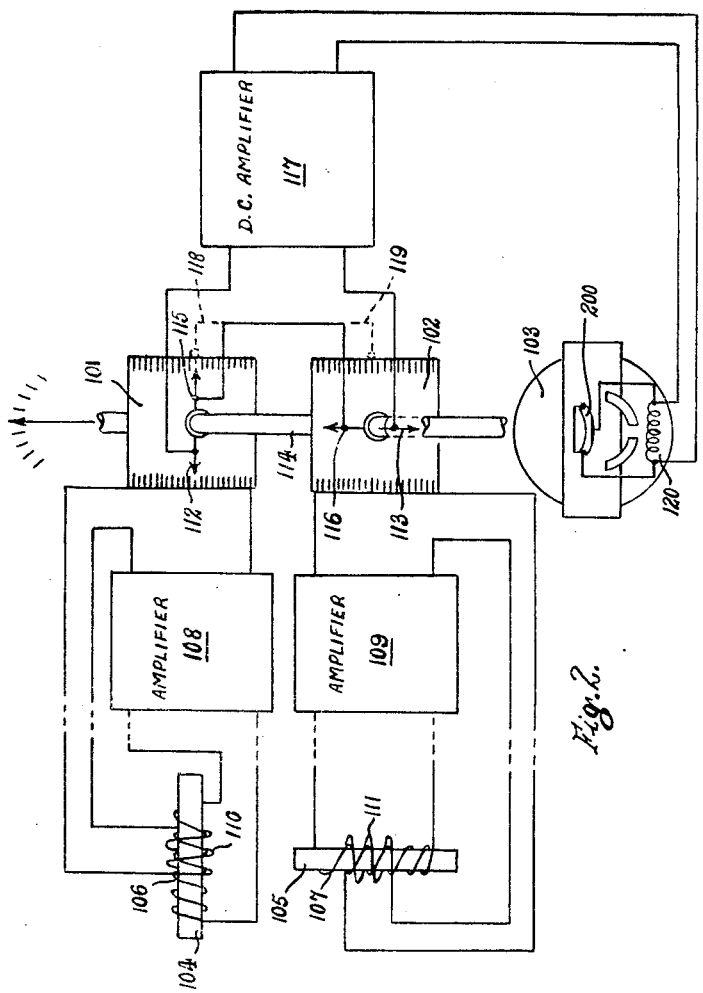

Compass apparatus in accordance with the invention is illustrated by the accompanying diagrammatic drawings of which:

Figure 1 shows schematically the essential components and connections of compass apparatus according to one form of the invention and arranged for the transmission of heading indications and/or drives in accordance with heading to subsidiary apparatus; and Figure 2 shows similarly a compass according to another form of the invention.

In the compass apparatus illustrated by Figure 1, two magnetic detector elements of known or convenient type, indicated at 11 and 12, disposed mutually at right angles are mounted pendulously in known or convenient manner (not shown) as a unit, indicated at 13 for installation in an aeroplane or other craft at a position, such as within the tip of the wing of an aircraft, free from magnetic disturbance, with said elements 11 and 12 extending for convenience fore and aft and transversely, respectively, of the craft. Said elements 11 and 12 thus define a magnetic heading reference by producing outputs corresponding to components of the earth's field along their axes, and which are proportional to H cos θ and to H sin θ, respectively, where H represents the earth's field and θ the magnetic heading angle. The pick-up windings, indicated at 14 and 15, of the detector elements 11 and 12 are connected across the windings of two sine-cosine potentiometers 16 and 17, respectively, which are thus energised in accordance with the cosine and with the sine, respectively, of the magnetic heading angle.

Fixed centre contacts 18 and 19 of the potentiometers 16 and 17 are connected by leads 20 and 21 to the input of an amplifier, indicated generally at 22, which includes phase discriminating means of known or convenient type (not shown) affording a direct current output. Radial moving contact arms 23 and 24 of the potentiometers 16 and 17 are fast upon a common operating shaft 25 which, as explained hereinafter, is rotated to adjust the potentiometers in accordance with a reference heading afforded by an azimuth gyroscope indicated at 26. The contact arms 23 and 24 are disposed mutually at right angles and the windings of the potentiometers 16 and 17 extend parallel with one another, whilst the contact arms 23 and 24 are connected together by a lead 28 (shown as including a direct current blocking condenser for a purpose hereinafter explained). Thus the outputs from the potentiometers 16 and 17 are applied in opposition to the amplifier 22 and that from the potentiometer 16 varies with the sine of the gyroscopic heading angle whilst that from the potentiometer 17 varies with the cosine of said angle. Said outputs can be represented by $$K_1 H \cos \Theta \sin A$$

and $K_2 H \sin \Theta \cos A$, where $K_1$ and $K_2$ are constants dependent on the characteristics of the detector elements 11 and 12 and of the potentiometers 16 and 17 respectively, and A represents the gyroscopic heading angle. In practice $K_1$ is made substantially equal to $K_2$ and the input to the amplifier 22 can then be represented by $$K \sin (\Theta - A)$$

The azimuth gyroscope 26 has associated therewith a transmitting autosyn, indicated at 27, which is adjusted thereby in accordance with the gyroscope azimuthal position and is connected by leads 29 with a receiving autosyn 30 on the shaft 25, the output from the autosyn 30 being applied via an amplifier, indicated at 31, to supply one phase of a two phase induction motor, indicated at 32, serving as a follow-up motor which is coupled to the shaft 25 for adjusting the autosyn 30 to null positions and so rotating the shaft 25 and adjusting the potentiometers 16 and 17 in accordance with the gyroscopic heading reference. The other phase of the motor 32 is constantly excited via leads not shown.

The direct current output from the amplifier 22, which corresponds in polarity and magnitude to the input thereto from the potentiometers 16 and 17, is fed via leads 33 and 34 to energise a precessing coil, indicated at 35, mounted on the vertical gimbal ring (not shown) of the gyroscope 26 and a coil 36, connected in series with the precessing coil 35, of an indicator device indicated generally at 37. The coil 35 serves in conjunction with two arcuate permanent magnets 38 and 39 mounted on the inner gimbal ring, indicated at 40, with like poles adjacent, to apply torque to said inner ring 40 so as to precess the gyroscope 26 in azimuth and thus adjust the gyroscopic heading reference. The indicator device 37 comprises a permanent magnet 41, pivotally mounted remote from one end which latter extends between pole pieces indicated at 42 of the coil 36, and a pointer 43 carried by said magnet 41 and thereby moved over a scale 44 in accordance with the output from the amplifier 22, thus affording an indication as to whether, in what sense and to what extent the gyroscopic heading reference diverges from the magnetic heading reference defined by the detector elements 11 and 12.

It will be understood that the apparatus described will be subject to errors due to any non-linearity of the output-field characteristics of the detector elements employed and by the outputs from the sine-cosine potentiometers not being exactly in phase so that they will not balance to a good null and the output from the amplifier will therefore not be zero when the gyroscopic and magnetic references correspond.

Figure 1 shows how by very simple means such errors may be minimised and a high degree of accuracy obtained by producing at the detector elements and in opposition to the components ($H \cos \Theta$ and $H \sin \Theta$) of the earth's field along their axes local nulling field components which, when the gyroscopic and magnetic heading references correspond, are substantially equal to said components of the earth's field but, otherwise, differ from such substantial equality to said earth's field components with divergence of the gyroscopic heading reference from the magnetic heading reference.

For this purpose, the direct current supply, indicated by + and − leads 45 and 46, of the amplifier 22 is connected with the fixed contacts 18 and 19 of the sine-cosine potentiometers 16 and 17, the input to said amplifier 22 being isolated from the direct current supply by an input transformer 47, through the primary winding of which the lead 46 is connected with the potentiometer contact 19 and a direct current blocking condenser 48, through which said primary winding is connected with the potentiometer contact 18. The potentiometers 16 and 17 are provided with additional "direct current" moving contact arms 49 and 50 fast on the shaft 25 and disposed mutually at right angles and at right angles also to the "signal" contact arms 23 and 24. The abovementioned blocking condenser included in the lead 28 joining the contact arms 23 and 24, and a choke coil 51 tuned by a condenser 52 included in a lead 53 joining the direct current contact arms 49 and 50, serve to separate the alternating signal current and direct nulling current circuits.

It will be seen that the potentiometer 16 and, therefore, the pick-up coil 14 of the fore and aft detector element will be energised by direct current corresponding to the cosine of the gyroscopic heading angle and the potentiometer 17 and transverse pick-up coil 15 according to the sine of the gyroscopic heading angle, and that there will thus be produced along the axes of the detector elements local nulling field components which may be represented by $$X_1 \cos A \text{ and } X_2 \sin A$$

where A represents the gyroscopic heading angle and $X_1$ and $X_2$ are constants of proportionality of the nulling field components to cos A and sin A, respectively. In this way there are produced along the axes of the detector elements 11 and 12 residual fields which can be represented by $H \cos \Theta - X_1 \cos A$ and $H \sin \Theta - X_2 \sin A$, and which can be made substantially zero when the magnetic and gyroscopic heading references correspond ($\Theta = A$).

When such local nulling fields are thus employed there will be obtained from the sine-cosine potentiometers 16 and 17 outputs which can be represented by $K_1(H \cos \Theta - X_1 \cos A) \sin A$ and $K_2(H \sin \Theta - X_2 \sin A) \cos A$.

The constants $X_1$ and $X_2$ can be adjusted to equality by a variable resistance (shunted by a by-pass condenser) connected in series with the pick-up winding of one detector element and the corresponding potentiometer, as indicated at 54 and the constants $K_1$ and $K_2$ can be adjusted similarly by a resistance 55 (with no by-pass condenser) connected in series with a detector element pick-up winding.

The production of local nulling field components at the detector elements as set forth does not reduce the overall sensitivity, reduces errors due to any lack of equality between the constants $K_1$ and $K_2$ according to the characteristics of the detector elements and the associated potentiometers, by a factor depending upon the equality of the local nulling field X to the earth's field H (additional error due to inequality between the constants $X_1$ and $X_2$ being reducible to negligible value) and, in view of the weak residual fields enables the detector elements to be made very sensitive without regard to considerations of linearity.

To compensate for the variation in magnitude of the earth's field at different regions of the earth's surface, in the apparatus described, a variable resistance, indicated at 56, having three adjustments, for example, marked "tropical," "temperate" and "polar," is included in one direct current supply lead to the potentiometers 16 and 17.

In the apparatus described the same sine-cosine potentiometers are employed, as is very convenient, to produce the local nulling field components as well as to control the means for adjusting the gyroscopic heading reference. It will be apparent, however, that a single additional sine-cosine potentiometer with two moving contacts set mutually at right angles, or two additional sine-cosine potentiometers with their resistance elements and moving contacts appropriately disposed or set, may be employed instead in conjunction with a source of direct current to energise the pick-up windings or additional windings or coils associated with the detector elements to produce the local nulling field components, such additional potentiometers being coupled to the shaft 25 for adjustment in accordance with the gyroscopic heading reference.

Whether or not such local nulling field components are provided, the common operating shaft 25 has directly coupled therewith a "master" heading indicator indicated at 57 and also one or more devices, indicated at 58, of known or convenient type for transmitting heading indications and/or affording drives in accordance with such indications to subsidiary apparatus (not shown) such as compass "repeaters" and/or dead reckoning navigation apparatus. Said shaft and associated components may be incorporated in a "master indicator" indicator unit, for location for example at a navigator's station, with which such subsidiary apparatus is connected, or in some cases may be built into a subsidiary apparatus unit.

Connections of the detector elements 11 and 12, for excitation, and of the amplifier 22 and autosyn 27, for supply and excitation, from a common alternating current source are indicated by X—X.

It will be apparent that the sine-cosine potentiometers 16 and 17 (together with any additional potentiometer or potentiometers for nulling fields) can in some cases be associated with the gyroscope 26 for adjustment directly thereby, but the arrangement described above is preferable where subsidiary apparatus is used in conjunction with the compass because it enables transmitting means for such subsidiary apparatus to be dissociated from the gyroscope and yet to be operated in accordance with the most accurate heading reference and thus not only may considerable torque be transmitted, but very accurate transmitting means themselves requiring appreciable torque for their operation may be employed. Also, the gyroscope assembly is simplified and the gyroscope performance impaired to a minimum extent. Errors due to electric (autosyn or other) means connecting the gyroscope to the sine-cosine potentiometers, will appear at the gyroscope but this will not, in general, be disadvantageous because extreme accuracy of indication at the gyroscope is usually not required for instance by a pilot.

The compass apparatus of Figure 2 has sine-cosine potentiometers 101 and 102 directly associated with an azimuth gyroscope indicated at 103 for adjustment in accordance with the gyroscopic heading reference. The detector elements, indicated separately at 104 and 105, but which actually are mounted as a pendulous unit for installation with the element 104 fore and aft and the other transversely of a craft as in the case of Figure 1, have their pick-up windings, indicated at 106 and 107, connected with the inputs of amplifiers, indicated at 108 and 109, respectively, which include phase discriminating rectifier means (not shown) of known or convenient type and afford direct current outputs corresponding in magnitude and polarity to the magnitude and phase of the inputs applied thereto from the pick-up windings 106 and 107, respectively. The pick-up windings 106 and 107 are surrounded by concentric feed back coils, indicated at 110 and 111, respectively, which are connected in series with the corresponding potentiometers 101 and 102 and the outputs of the corresponding amplifiers 108 and 109. The direct current outputs from said amplifiers 108 and 109 are thus applied to the corresponding feed back coils 110 and 111, as well as to the corresponding potentiometers 101 and 102, in such sense as to produce at said elements 104 and 105 local field components in opposition to the components of the earth's field along the axes of the elements 104 and 105. In this way the energisation of the feed back coils 110 and 111 by the detector elements 104 and 105 can be made proportional to the components of the earth's field along the axes of the detector elements 104 and 105 to a high degree of accuracy. In practice it is found sufficient to produce by the feed back coil 110 a local opposing field corresponding to $$\frac{29}{30}H\cos\theta$$

so that the residual field at the detector element 104 will correspond to $$\frac{1}{30}H\cos\theta$$

and similarly for the transverse element 105 to produce a residual field corresponding to $$\frac{1}{30}H\sin\theta$$

The actual voltages applied to the sine-cosine potentiometers 101 and 102 may be represented by $KH\cos\theta$ and $KH\sin\theta$, respectively, where K is a constant depending on the design of the feed back coils and the sensitivity and gain of the corresponding detector elements 104 and 105 and amplifiers 108 and 109, which in practice can be made the same in the two circuits.

The potentiometers 101 and 102 have radial contact arms 112 and 113, indicated as fast on a common operating shaft 114, which are disposed mutually at right angles to one another, and the outputs from the potentiometers are taken from between said contact arms 112 and 113 and further contact arms 115 and 116 disposed diametrically opposite thereto, respectively. The contact arms 112 and 113 are connected with the input of a direct current amplifier, indicated at 117, and the contact arms 115 and 116 are connected together so that the outputs from the potentiometers 101 and 102 are applied in opposition to the amplifier 117. By the employment of the additional contact arms 115 and 116 the outputs from the potentiometers 101 and 102 are double what they would be if said arms 115 and 116 were not used and central fixed contacts of said potentiometers 101 and 102 connected together as indicated by broken lines at 118 and 119 were used instead.

As in the case of Figure 1 the output from the amplifier 117, to which the outputs from the sine-cosine potentiometers are applied in opposition, is connected to energise a precessing coil, indicated at 120, on the gyroscope 103 to precess the latter in azimuth and so adjust the gyroscopic heading reference in accordance with said opposed potentiometer outputs. Also although not shown in Figure 2 an indicator device similar to that shown at 37 of Figure 1 is preferably provided.

It will be apparent that, if desired, the gyroscope 103 may be separated from the sine-cosine potentiometers 101 and 102 and connected by electric means to adjust them as in the case of Figure 1.

As the outputs from the sine-cosine potentiometers in the case of Figure 2, or in the case of Figure 1 if the means described for producing local nulling field components are omitted, will be large, a correspondingly large reference voltage will be needed for the phase discriminating rectifier means employed. It is desirable, therefore, in such cases, that the detector elements excitation current should have a direct current component and a relatively small alternating current component such that the response of said elements is suppressed at alternate half cycles and outputs are obtained therefrom at the excitation frequency at which a substantial reference voltage may more conveniently be obtained than at the second harmonic frequency. Excitation by alternating current only in the case of Figure 1 where local nulling field components are produced is simpler and is preferably employed as the relatively small reference voltage at twice the excitation frequency then required may readily be obtained, e. g. across a resistance included in the negative lead from a full wave rectifier to the smoothing circuit of the direct current high tension supply of the amplifier.

In compass apparatus according to the invention the maximum rate at which the gyroscopic heading is adjusted will, in general, be limited by appropriate design of the components involved, e. g. of the gyroscope precessing means, in order to reduce the effect of magnetic heading reference errors caused by displacement of the detector elements from the horizontal for example during banked turns or other manoeuvres of a craft in which the apparatus is installed. Such errors may well be considerable, for example, in Europe or North America where the magnetic dip angle is great and, as stated above, will be introduced by displacement of the detector elements with reference to a north-south axis, being maximum for displacement about a north-south axis and zero for displacement about an east-west axis. Where an azimuth gyroscope is employed to afford the gyroscopic heading reference, therefore, and in accordance with the invention which is the subject of British Patent No. 586,507, advantage may be taken of this "directionality" by employing the same gyroscope to prevent adjustment of the gyroscopic heading reference when conditions are such as to cause the magnetic heading reference to be in error in excess of a predetermined limit. For example, in the compass apparatus described above with reference to Figures 1 and 2, the azimuth gyroscope 26 or 103 may be arranged so that its spin axis lies east-west when the compass is in use, so that it will be responsive to accelerations or other conditions tending to displace the detector elements about a north-south axis and have mounted on its inner gimbal ring a gravity operated switch, indicated in the drawings as a mercury switch 200, whereby the precessing coil 35 or 120 of the gyroscope 26 or 103 will be short circuited when acceleration forces displace the apparent vertical in relation to a north-south axis through more than a predetermined angle, say three degrees. The use of a gravity switch is preferable for this purpose but, if desired, a switch actuated by relative movement, about a north-south axis, of the east-west spin axis and the frame of a gyroscope may be employed instead. Alternatively, the anti-topple or levelling means (not shown) of the azimuth gyroscope may be used to actuate a switch or a relay sensitive to current in electric anti-topple means to prevent adjustment of the gyroscopic heading reference whenever the east-west gyroscope spin axis is displaced relatively to apparent gravity and/or to the gyroscope frame by more than a predetermined amount.

In all cases, the stator of the sine-cosine potentiometers, i. e. the windings or resistance elements thereof as shown in the drawings, may be rotatable at will for variation setting. The resistance elements of the sine-cosine potentiometers shown in Figures 1 and 2 of the drawings comprise each a single closely wound layer of resistance wire on a thin substantially square former, but it will be understood that any angularly adjustable potentiometer arrangements giving outputs substantially proportional to the sine or cosine of the adjustment angle may be employed in gyromagnetic compass apparatus according to the invention.

We claim:

1. Gyromagnetic compass apparatus comprising a plurality of electro-magnetic detector elements for generating oscillatory electrical outputs corresponding to components of the earth's field along different reference axes respectively, said outputs defining a magnetic heading reference, two sine-cosine resolver devices each having input terminals, output terminals, and rotatable adjusting means for adjusting said device to produce at said output terminals an output electrical variation substantially proportional to the product of an input electrical variation applied to said input terminals and the sine of angular displacements of said adjusting means, means for applying said oscillatory electrical outputs respectively to said input terminals of said devices to generate at said output terminals voltages whose amplitudes vary with the sine and cosine respectively of displacements of said adjusting means, gyroscope means to afford a gyroscopic heading reference, means to combine said voltages to generate a control voltage dependent upon the difference between said magnetic and gyroscopic heading references, means responsive to changes in said gyroscopic heading reference to apply adjusting torque to said adjusting means and means to apply said control voltage to modify said torque in a sense to reduce said difference.

2. Gyromagnetic compass apparatus comprising a plurality of electro-magnetic detector elements for generating oscillatory electrical outputs corresponding to components of the earth's field along different reference axes respectively, said outputs defining a magnetic heading reference, two sine-cosine resolver devices each having input terminals, output terminals, and rotatable adjusting means for adjusting said device, means for applying said oscillatory electrical outputs respectively to said input terminals of said devices to generate at said output terminals voltages whose amplitudes vary with the sine and cosine respectively of displacements of said adjusting means, gyroscope means to afford a gyroscopic heading reference, means to combine said voltages to generate a control voltage dependent upon the difference between said magnetic and gyroscopic heading references, means responsive to changes in said gyroscopic heading reference to apply adjusting torque to said adjusting means and means to apply said control voltage to modify said torque in a sense to reduce said difference.

3. Gyromagnetic compass apparatus comprising two electro-magnetic detector elements for generating oscillatory electrical outputs of the same frequency and phase and of amplitude corresponding respectively to the cosine and sine of a magnetic heading angle, two sine-cosine resolver devices each having input terminals, output terminals, and rotatable adjusting means for adjusting said device, means for applying said oscillatory electrical outputs respectively to said input terminals of said devices to generate at said output terminals voltages whose amplitudes vary with the sine and cosine respectively of displacements of said adjusting means, a gyroscope to afford a gyroscopic heading reference, means for actuating said adjusting means in accordance with said gyroscopic heading reference, heading control means for adjusting said gyroscopic heading reference, means combining said voltages to produce a direct current varying in intensity and sign in accordance with the difference between said voltages and hence with the relative displacement of the said gyroscopic heading reference from the said magnetic heading angle and means for applying said direct current to said heading control means to bring said gyroscopic heading reference into substantial correspondence with said magnetic heading angle.

4. Gyromagnetic compass apparatus comprising two electro-magnetic detector elements for generating two oscillatory electrical outputs of the same frequency and phase and having amplitudes corresponding respectively to the cosine and sine of a magnetic heading angle, two sine-cosine resolver devices each having input terminals, output terminals, and rotatable adjusting means for adjusting said device, means for applying said oscillatory electrical outputs respectively to said input terminals of said devices to generate at said output terminals voltages whose amplitudes vary with the sine and cosine respectively of displacements of said adjusting means, a gyroscope to afford a gyroscopic heading reference, means for actuating said adjusting means in accordance with said gyroscopic heading reference, heading control means for adjusting said gyroscopic heading reference, means to combine said voltages to generate a control voltage dependent upon the difference between said magnetic and gyroscopic heading references, means to apply said control voltage to said heading control means to bring said gyroscopic heading reference into substantial correspondence with said magnetic heading reference, and error-reducing means for generating at each of said detector elements a local magnetic field component in opposition to the component of the earth's magnetic field at said element.

5. Gyromagnetic compass apparatus according to claim 4, wherein said error-reducing means comprise two amplifiers, each including phase-discriminating means, connected respectively to amplify and derive compensating direct currents from oscillations from said detector elements, a feed-back winding on each of said detector elements, and means for feeding said compensating direct currents to said feed-back windings.

6. Gyromagnetic compass apparatus according to claim 5, wherein said devices are constituted by potentiometer devices and wherein said feedback windings are connected in series with said potentiometer devices respectively.

7. Gyromagnetic compass apparatus according to claim 4, wherein said error-reducing means comprise windings associated with said detector elements respectively, at least one sine-cosine potentiometer device, adjusting means for this potentiometer device, means for actuating the last-named adjusting means in accordance with said gyroscopic heading reference, a source of direct current and means for applying current from said source controlled by said potentiometer device to said windings.

8. Gyromagnetic compass apparatus comprising two electro-magnetic detector elements for generating, in pick-up windings thereof, oscillatory electrical outputs of the same frequency and phase and of amplitude corresponding respectively to the cosine and sine of a magnetic heading angle, two sine-cosine potentiometer devices each having input and output terminals, a direct current and an alternating current contact on each of said devices, connections between the direct current and alternating current contacts of one of said devices and the direct current and alternating current contacts respectively of the other of said devices, said connections between said direct current and said alternating current contacts presenting substantial impedance to the alternating and direct currents in such connections respectively, direct current supply means connected to pass supply current through said pick-up windings and said potentiometer devices, means for applying said oscillatory electric outputs to said input terminals of said potentiometer devices respectively to generate at said output terminals voltages whose amplitudes vary with the sine and cosine respectively of displacements of said adjusting means, a gyroscope to afford a gyroscopic heading reference, actuating means for actuating said contacts in accordance with said gyroscopic heading reference, heading control means for adjusting said gyroscopic heading reference, means to combine said voltages to generate a control voltage dependent upon the difference between said magnetic and gyroscopic heading references, means to apply said control voltage to said heading control means to bring said gyroscopic heading reference into substantial correspondence with said magnetic heading reference.

9. Gyromagnetic compass apparatus according to claim 8, wherein said direct current and alternating current contacts on each said potentiometer device are mutually perpendicular.

10. Gyromagnetic compass apparatus according to claim 9, wherein said actuating means are constituted to actuate said alternating current contacts in accordance with the sine and cosine respectively of said gyroscopic heading reference and to actuate said direct current contacts in accordance with the cosine and sine respectively of said gyroscopic heading reference.

11. Gyromagnetic compass apparatus comprising two electromagnetic detector elements for generating oscillatory electrical outputs of the same frequency and phase and of amplitudes corresponding respectively to the cosine and sine of a magnetic heading angle, two sine-cosine resolver devices each having input terminals, output terminals, and rotatable adjusting means for adjusting said devices, means for applying said oscillatory electrical outputs respectively to said resolver devices to generate at said output terminals voltages whose amplitudes vary with the sine and cosine respectively of displacements of said adjusting means, a gyroscope to afford a gyroscopic heading reference, means to combine said voltages to generate a control voltage dependent upon the difference between said magnetic and gyroscopic heading references, means responsive to changes in said gyroscopic heading reference to apply adjusting torque to said adjusting means and means to apply said control voltage to modify said torque in a sense to reduce said difference.

HAROLD CHARLES PRITCHARD.
IVOR LEWIS THOMAS.
GWILYM EMRYS ROBERTS.

REFERENCES CITED

The following references are of record in the file of this patent:

UNITED STATES PATENTS

| Number | Name | Date |
|---|---|---|
| 2,220,055 | Fischel et al. | Oct. 29, 1940 |
| 2,361,790 | Noxon | Oct. 31, 1944 |
| 2,383,461 | Esval et al. | Aug. 28, 1945 |

FOREIGN PATENTS

| Number | Country | Date |
|---|---|---|
| 49,251 | France | Nov. 12, 1938 |
| | (1st addition to French Patent 793,301) | |
| 586,506 | Great Britain | Mar. 20, 1947 |
| 586,507 | Great Britain | Mar. 20, 1947 |